June 9, 1942.  J. L. ROOF  2,285,533
DAMPER OR VALVE
Filed June 21, 1940
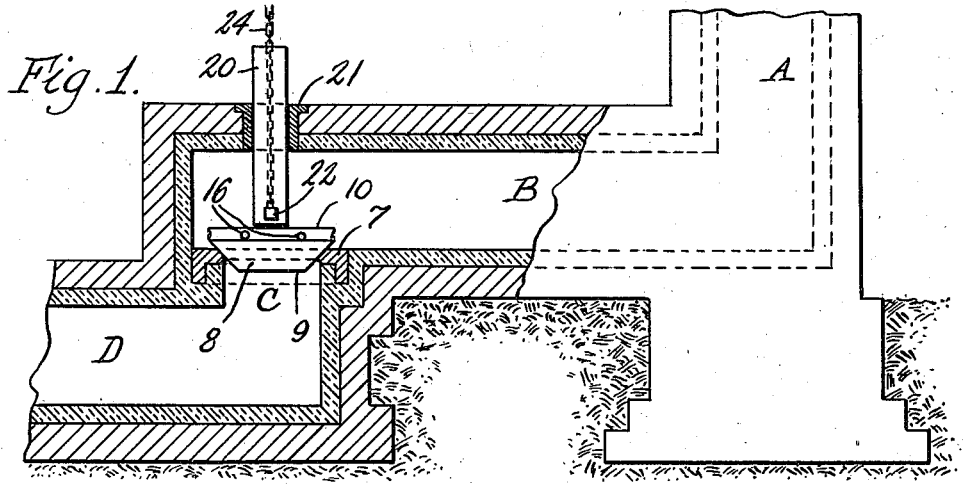
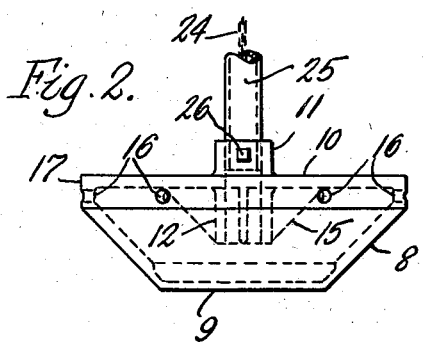
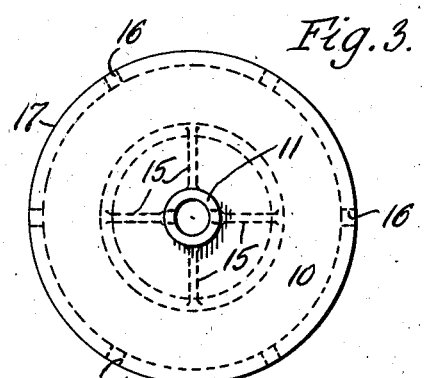
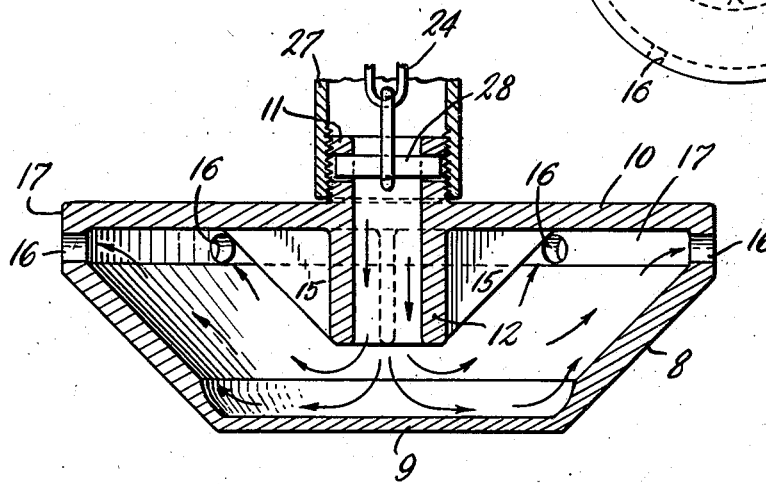
INVENTOR.
Jay L. Roof
by Parker, Rockwood & Farmer
ATTORNEYS.

Patented June 9, 1942

2,285,533

UNITED STATES PATENT OFFICE 2,285,533

DAMPER OR VALVE

Jay L. Roof, Hamburg, N. Y.

Application June 21, 1940, Serial No. 341,698

7 Claims. (Cl. 251—159)

This invention relates to improvements in dampers or valves of the kind used in ducts for controlling and regulating the passage of gaseous fuel, pre-heated air and hot products of combustion therethrough.

Dampers or valves of this type are commonly employed in industry, to control the flow of hot products of combustion and heated air as may be required. Since the products of combustion, air or other gases may be of very high temperatures, the dampers heretofore commonly employed soon become damaged or destroyed due to the heat to which they are exposed. Means have heretofore been employed for cooling dampers or valves of this kind which are dependent upon an adequate supply of water or other cooling liquid, or upon a compressor or blower for delivering cooling air to the dampers or valves.

One of the objects of this invention is to provide an improved and simplified damper or valve which is so constructed that the draft or suction in the duct in which the damper is located serves to draw the required amount of cooling air through the damper. A further object of this invention is to provide a damper of this kind in which the flow of cooling air is regulated so as to insure an effective and thorough cooling of the damper. It is also an object of this invention to provide a damper of the mushroom type which is so constructed that in the event it becomes excessively heated, the damper will still continue to function properly. A further object is to provide a damper of this kind with an improved device for moving the same toward or from its seat, which device will be substantially unaffected by the hot gases in which the damper operates. A further object is to provide a damper of this kind of strong and rigid construction and which is continuously and amply cooled, so that the life of the damper will greatly exceed that of similar dampers heretofore used for the same purpose.

Other objects of this invention will appear from the following description and claims.

In the accompanying drawing:

Fig. 1 is an elevation, partly in section of a smoke duct having a damper embodying this invention applied thereto.

Fig. 2 is a side elevation showing an improved damper, on an enlarged scale, and having slightly modified air inlet device.

Fig. 3 is a top plan view thereof.

Fig. 4 is a central sectional elevation on a still larger scale of a damper having still another form of air inlet device.

In Fig. 1, I have shown by way of example, one installation in which my improved damper may be employed, but it will be understood that it is not intended to limit the invention for use in connection with installations of the particular type shown. In Fig. 1, A represents a chimney or flue, and B a smoke duct leading to the chimney and extending in a substantially horizontal direction. This duct communicates with a vertical passage C connecting with another horizontal duct D. 7 represents a valve seat of any suitable or desired form arranged about the upper end of the upright part C of the duct. The valve seat may be of the type heretofore commonly employed for such purposes and my improved damper is constructed to cooperate therewith.

The damper is of a mushroom shape and has a seating portion or face adapted to cooperate with whatever type of valve seat may be employed. If the damper is to cooperate with a frusto-conical seat, it is provided with a corresponding frusto-conical seating portion or face 8 and lower and upper walls 9 and 10 which, together with the seating portion 8, form a mushroom type damper with a hollow body.

In order to provide for the cooling of the damper, I provide means for admitting outside air to the interior of the same, this being preferably accomplished by means of a substantially centrally located tubular stem 11 preferably formed integral with the top wall 10 of the mushroom damper and extending upwardly therefrom. Preferably this stem also has a portion or extension 12 which extends downwardly into the hollow interior of the damper. In order to reinforce the inwardly extending part of the hollow stem, and also the top wall 10 against the strains resulting from raising the damper from its seat, a number of radially extending reinforcing fins 15 may be provided which may, for example, be formed integral with the inner part 12 of the hollow stem. It will be noted that this stem terminates at a slight distance above the bottom wall 9 of the damper so that air passing into the damper through the hollow stem will be discharged against the lower wall 9 of the damper which is, of course, exposed to the greatest heat. The air is discharged from the damper through a series of holes or openings 16 arranged above the seating portion 8 of the damper, and if desired, the damper may be provided with a short substantially cylindrical wall 17 between the seating portion 8 and the upper wall 10 in which the apertures 16 are located.

It will be noted that the damper is so formed that all of the parts thereof so far described may be formed in a single casting, but it will, of course, be understood that the damper may, if desired, be made of a number of different parts suitably secured together.

In order to supply cooling air to the hollow stem 11 of the damper, I preferably provide a pipe or conduit of any desired form, one end of which is suitably connected to the hollow stem 11 and the other open end of which terminates at the exterior of the duct B. In Figs. 1 and 4, I have illustrated for this purpose, a pipe 20 which is of such size as to fit about the outer cylindrical surface of the hollow stem 11. This pipe extends through a hole in the wall of the flue B, and if desired, a bushing 21 may be provided in this hole. The lower end of the pipe 20 may be secured to the stem 11 in any suitable or desired manner, and by way of example, I have shown the stem 11 and the pipe 20 in Fig. 1 as provided with registering apertures through which a bolt 22 may extend to form a connection between the pipe 20 and the stem 11. The bolt 22 may also serve as a connection between the damper and a suitable hoisting device, such as a chain 24. The damper may, of course, be raised and lowered by means of the pipe 20. As a rule, these dampers are of relatively large size and hoisting means are necessary to raise and lower them, and consequently, a flexible member, such as a cable or the chain 24, may be easily used to cooperate with a windlass or other hoisting device. The pipe 20, consequently, in addition to conducting cooling air to the damper, serves as a guide to insure proper seating of the damper.

In Fig. 2, I have shown a pipe 25 of smaller diameter which may fit into the interior of the hollow stem 11. I have also shown this pipe 25 secured to the hollow stem by means of a bolt or pin 26.

Another form of connection between the stem of the damper and the air conducting pipe is shown in Fig. 4, in which a pipe 27 has a threaded engagement with the stem 11. In this construction, a short pin 28 is employed to which the flexible hoisting member or chain 24 may be secured. The ends of the pin engage in holes in the stem and the pipe confines the pin in its operative position in the stem. While in the three forms of connection between the damper and the pipe, the pipe is shown secured to the stem, yet it is not necessary in all cases that the pipe be secured to the damper. For example in Fig. 4, the threaded connection between the pipe and the stem may be omitted and the lower end of the pipe 27 may merely telescope over the stem 11 and rest by gravity in operative relation to the damper.

The arrangement described for hoisting and lowering the damper from or toward its seat, has the advantage that the flexible supporting member 24 is located in the interior of the air pipe, where it is protected not only from the heat of the gases in the duct B, but also from corrosion due to the gases. Consequently, the flexible hoisting member is always located in a current of cooling air, thus greatly increasing its life.

In the operation of my improved damper, the suction in the duct B will, of course, draw air out of the hollow damper through the discharge openings 16 therein. This induces a flow of air downwardly through the pipe 20, 25 or 27 and through the hollow stem 11 into the interior of the damper. By providing this stem with an extension 12, this incoming cool air will impinge on and blow directly across the inner surface of the lower wall 9 of the damper, thus producing a scrubbing action of the air on this wall. This is an important feature of my improved damper, for the reason that the wall 9 is subjected to the greatest amount of heat, whether the damper is in closed or open position, and consequently, by means of my construction, the maximum cooling effect is applied to this wall because of the scrubbing action of the cool incoming air. The air after being deflected radially in all directions by the lower wall 9 will pass along the seating portions 8 of the damper to the discharge openings 16. It will be noted that these discharge openings are located at intervals around the damper so that cooling air will flow radially in all directions after its direction of flow is changed by the bottom wall 9 of the damper. The radial fins 15 in addition to reinforcing the portion 12 of the hollow stem also serve to guide the cooling air radially and prevent the setting up of a whirling body of air in the damper, so that the most direct and efficient flow of cooling air through the damper results. Furthermore, by locating the discharge openings 16 just beyond the upper edges of the seating portion 8 of the damper, the cooling air will be drawn to the discharge opening 16 over the valve seating portion 8, a part of which is also exposed to high temperatures of the gases. Preferably, the holes or openings 16 are arranged to extend laterally of the axis of the damper, rather than upwardly, so as to prevent soot or other solid matter from dropping through the openings 16 into the interior of the damper and also from entirely or partly obstructing the openings. This helps to make the damper reliable in its operation for long periods of time and adds greatly to its life, since the damper in most installations cannot readily be inspected or cleaned.

Since the bottom wall 9 of the damper is subjected to the greatest heat, it will, of course, tend to expand to a greater extent than other parts of the damper. In order to prevent the expansion of the lower wall 9 from damaging the seating portion of the damper, I have shown the wall 9 as made of materially less thickness than the adjacent walls of the seating portion. Consequently, if the bottom wall 9 becomes excessively heated, it may buckle or warp out of its normal or flat position, but if it does so, it will not distort the seating portion 8 of the damper. The buckling or warping of the wall 9 will, of course, in no way interfere with the successful operation of the damper, so long as the seating portion 8 cooperates properly with the seat 7.

The cooling of the damper by means of outside air will, of course, continue so long as there is any draft or suction in the duct B, regardless of whether the valve is in seating or closed position, or whether it is partly open or wide open. Consequently, no continuous supply of cooling water or other liquid need be maintained and also no blower or compressor for discharging cooling air need be used. The fact that the cooling is effected by the suction also makes it unnecessary to provide absolutely tight joints between the damper and an air supply pipe such as the pipe 20. While I have shown and described the damper used in a horizontal position, it will be obvious that the damper may be used in any position, particularly if the air supply pipe is secured thereto to act as a valve stem, in which case, the hoisting member or chain 24 may be omitted.

I claim as my invention:

1. An air cooled damper arranged to cooperate with an annular seat in a duct in which hot gases are induced to flow by suction, said damper being hollow and substantially of mushroom shape and having an annular substantially frusto-conical wall forming a seating portion, transverse walls formed integral with the opposite annular end zones of said seating portion, means for admitting cooling air into the interior of said damper through one of said transverse walls, means for deflecting the cooling air against the middle portion of the opposite transverse wall and deflecting the same outwardly therefrom, and air discharge openings in said damper and located adjacent to the outer edge of said first transverse wall, to cause air to flow against said opposite transverse wall and across the interior of said frusto-conical wall to said discharge openings.

2. An air cooled damper arranged to cooperate with an annular seat in a duct in which hot gases are induced to flow by suction, said damper being hollow and substantially of mushroom shape and having an annular seating portion, transverse walls formed integral with the opposite annular end zones of said seating portion, that wall which is exposed to the highest temperature being formed of thinner material than said seating portion to cause unequal heating of said seating portion and said thinner wall to limit deformation to said thinner wall and thereby prevent distortion of said seating portion, means for admitting cooling air into the interior of said damper, and openings in said damper through which cooling air is drawn out of said damper by the suction in said duct.

3. An air cooled damper arranged to cooperate with an annular seat in a duct in which hot gases are induced to flow by suction, said damper being hollow and substantially of mushroom shape and having a substantially frusto-conical seating portion, transverse walls spaced apart and connected with the opposite annular end zones of said seating portion, a hollow stem arranged substantially centrally in one of said walls and having a part extending outwardly from said wall and another part extending inwardly into the interior of said damper into proximity to the other wall, to cause the cooling air entering said hollow stem to impinge against said other wall, and openings in said damper through which air from the interior of said damper is drawn by the suction in said duct and which are positioned adjacent to the outer edge of said first wall to cause air after deflection against said other wall to pass across said seating portion, and means connected with said outwardly extending part of said hollow stem for admitting cooling air into said valve stem.

4. An air cooled damper arranged to cooperate with an annular seat in a duct in which hot gases are induced to flow by suction, said damper being hollow and substantially of mushroom shape and having a seating portion, a pair of spaced transverse walls connected with said seating portion, a hollow stem formed on one of said walls and extending outwardly therefrom, a pipe having an end portion telescopically arranged relatively to said stem and extending to the exterior of said duct to conduct cooling air to said damper, a hoisting member connected with said stem and arranged within said pipe, and apertures in said damper through which air may be withdrawn from said damper by the suction in said duct.

5. An air cooled damper arranged to cooperate with an annular seat in a duct in which hot gases are induced to flow by suction, said damper being hollow and substantially of mushroom shape and having a seating portion, a pair of transverse walls connected with the opposite annular end zones of said seating portion, a hollow stem formed on one of said walls and extending outwardly therefrom, a pipe having an end portion telescopically arranged relatively to said stem and extending to the exterior of said duct to conduct cooling air to said damper, a hoisting member extending into said pipe to said stem, a common connecting device for securing said pipe and said hoisting member to said hollow stem, and apertures in said damper through which air may be withdrawn from said damper by the suction in said duct.

6. An air cooled damper arranged to cooperate with an annular seat in a duct in which hot gases are induced to flow by suction, said damper being hollow and substantially of mushroom shape and having a substantially frusto-conical seating portion, transverse walls connecting with the opposite annular end zones of said seating portion, a hollow stem arranged substantially centrally in one of said walls and extending within said damper toward the other wall, means for supplying cooling air to said hollow stem, openings in said damper through which air may be withdrawn from said damper by the suction in said duct, means connected with said hollow stem for moving said damper into and out of seating position, and a plurality of fins arranged within said damper and extending from the part of said stem arranged within said damper to said one wall for reinforcing said one wall and extending substantially in the direction of flow of air from said stem toward said openings.

7. An air cooled damper arranged to engage with an annular seat in a duct in which hot gases are induced to flow by suction, said damper being substantially of mushroom shape and being hollow and having a hollow stem communicating with the interior thereof and arranged substantially centrally of said damper, and a plurality of air discharge openings arranged in and adjacent to the peripheral portion of said damper, whereby air entering said damper through said hollow stem will pass substantially radially in said damper toward said openings, one of the walls of said damper being substantially frusto-conical and forming a seating portion adapted to cooperate with said seat, the inner face of said seating portion wall being arranged in the path of air moving from said duct to said openings, whereby the air passing through said openings will impinge on said seating portion to cool the same.

JAY L. ROOF.